United States Patent [19]
Amata

[11] Patent Number: 5,045,377
[45] Date of Patent: Sep. 3, 1991

[54] HIGH PERFORMANCE CONTINUOUS FIBER REINFORCED COMPOSITE GRID

[75] Inventor: Charles D. Amata, Plymouth, Minn.

[73] Assignee: Leucadia, Inc., New York, N.Y.

[21] Appl. No.: 583,009

[22] Filed: Sep. 14, 1990

Related U.S. Application Data

[63] Continuation of Ser. No. 254,316, Oct. 5, 1988, abandoned.

[51] Int. Cl.⁵ .......................... B32B 3/18; B32B 5/26; B29C 39/18
[52] U.S. Cl. ................................... 428/107; 264/136; 264/172; 264/174; 264/254; 264/255; 264/275; 264/279; 264/294; 264/DIG. 81
[58] Field of Search .......................................... 428/107

[56] References Cited

U.S. PATENT DOCUMENTS

| | | | |
|---|---|---|---|
| 2,545,981 | 3/1951 | Warp | 428/107 |
| 3,867,242 | 2/1975 | Miller | 428/107 |
| 3,949,111 | 4/1976 | Pelletier | 428/107 |
| 4,190,692 | 2/1980 | Larsen | 428/107 |
| 4,201,814 | 5/1980 | Gilbert et al. | 428/107 |
| 4,312,917 | 1/1982 | Hawley | . |
| 4,374,798 | 2/1983 | Mercer | . |
| 4,439,387 | 3/1984 | Hawley | . |

OTHER PUBLICATIONS

Sneller, Joseph A., "Thermoplastics Open the Way to Mass-Produced RP Composites", *Modern Plastics*, Feb., 1985.

Product Reference to Commercially Available Grid Products, GSI Nets 100, 200 and 300, made by Geo--Synthetics Co.

*Primary Examiner*—James C. Cannon
*Attorney, Agent, or Firm*—Vidas & Arrett

[57] ABSTRACT

Geogrid net-like structures including compound composite reinforced strands.

15 Claims, 2 Drawing Sheets

U.S. Patent     Sep. 3, 1991     Sheet 1 of 2     5,045,377
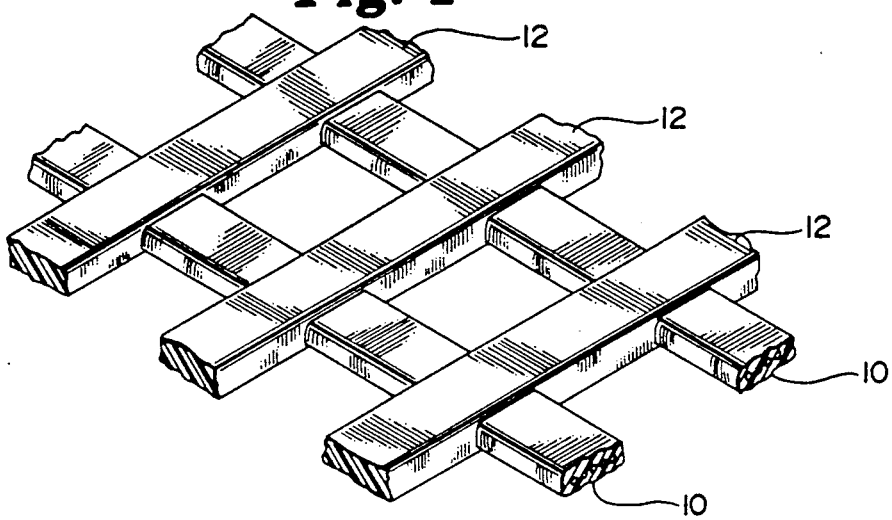
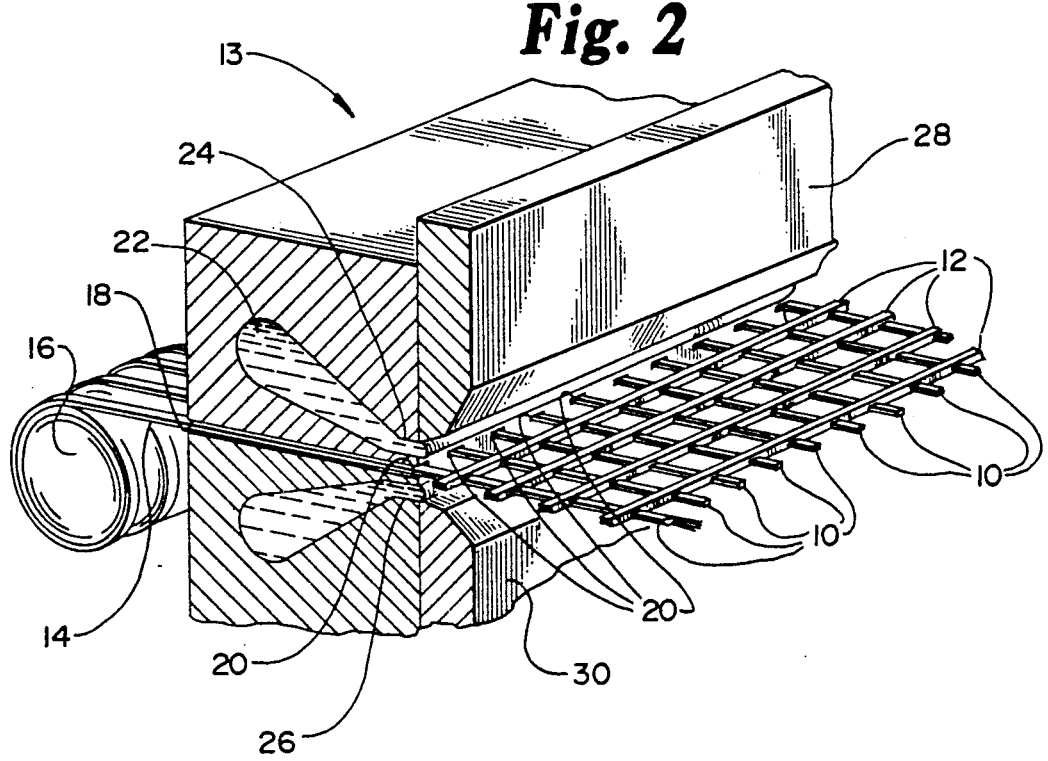

HIGH PERFORMANCE CONTINUOUS FIBER REINFORCED COMPOSITE GRID

This application is a continuation of co-pending application Ser. No. 07/254,316, filed Oct. 5, 1988 now abandoned.

BACKGROUND OF THE INVENTION

This invention relates to improved plastic grid structures. Plastic grid structures have been used in various civil engineering applications, such as soil retention and reinforcement, as well as in other applications. These grid structures have not been as strong and as dimensionally stable as is desired. Typically the grid structures are comprised of intersecting strands which define a mesh structure or net. Preferably, the grid is rectangular or square with the strands placed at an angle of about 90° to each other. However, other shapes and other relative angles may be used. Both thermoset and thermoplastic plastic materials are also used. Presently available grid structures are marketed by the Geo-Synthetics Company as GSI Net 100, 200 and 300; by Signode as TNX 5001 & 250 and as CTX 1255 & 120; by Huesker Synthetic as HaTe Grid 80/30-20 and 40/40-20 and as HaTelit 30/13; by the Mirafi Company as Miragrid and as Paragrid; by Tensar Corporation as UX 1100, 1200, 1300, 1400, 1500 and 1600 and as BX 1100, 1200, 1300 and 3110.

Plastic compound composites with reinforcement are known in which various types of fibers are embedded in plastic. Reference may be made to U.S. Pat. Nos. 4,312,387 and 4,312,917 which describe a compound composite structure of fiber embedded in a resin which is subsequently encased in additional plastic.

Reference may also be made to an article entitled "Thermoplastics Open the Way to Mass-Produced RP Composites" by Joseph A. Sneller which appeared in the February 1985 issue of *Modern Plastics*. This article describes the availability of prepreg tapes formed by pultrusion using various plastics and fibers. These references are all incorporated herein by reference.

SUMMARY OF THE INVENTION

It is the purpose of this invention to provide plastic grid structures of improved strength and dimensional stability by incorporating compound composite plastic strands into the grid structure. The invention takes the form of improved grid structures and a method of making them.

BRIEF DESCRIPTION OF THE DRAWINGS

FIG. 1 shows schematic grid structure which may be provided in two different basic embodiments.

FIG. 2 shows in schematic form a die for making the grid structures of the invention.

FIG. 3 is a fragmentary side elevational view with parts cutaway and FIG. 4 is an enlarged detail of the area circled at 4 in FIG. 3.

DESCRIPTION OF THE PREFERRED EMBODIMENTS

Figure 3:
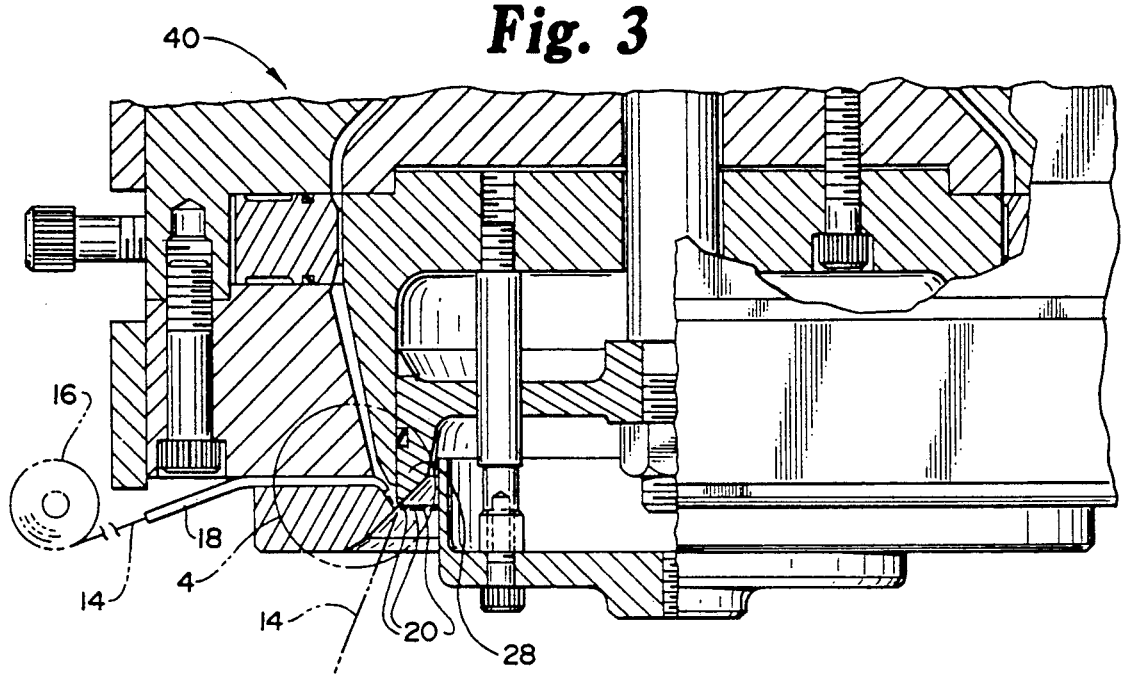
FIGS. 3 and 4 shows in schematic form another die arrangement.

In the improved grid structures of the invention, continuous fiber reinforced/resin matrix compound composite strands are joined by similar compound composite strands, by simple unreinforced plastic strands or by any type of plastic strand. Referring to FIG. 1, the schematic grid structure shown may consist of strands 10 extending in one direction and strands 12 extending in a transverse direction. The strands are polymeric elongate members which cross and intersect to form the net-like structure. Both or only one of the sets of strands may be of the compound composite reinforced structure referred to above. If only one set is composite, it is preferred that the set which extends in, what is referred to as the machine direction (MD), be the composite set. The composite strands may be formed with either thermoset or thermoplastic plastic; the latter being preferred. Formation of the composite strands is preferred to be by the resin impregnation pultrusion forming process but other forming and impregnation processes which produce thorough fiber wet-out with the resin and good fiber dispersion are also satisfactory. The structure of the compound composite strands will be better understood from the following description of a preferred method of formation of the grid structure i.e., the net.

Referring now to FIG. 2, an extrusion die 13 is shown for forming, the grid product. The machine direction strands (MD) 10 are the compound composite reinforced strands in this embodiment. They are formed by using what is termed a "prepreg" in the art. "Prepregs" are comprised of reinforcing fibers embedded in a plastic resin matrix. For example, prepreg tapes 14 wound on supply roll 16 may be comprised of continuous fibers of Type S-fiberglass embedded and uniformally dispersed in a high melt index polypropylene such as Fina 3861. The tapes are fed into entry points 18 in die 13. The prepreg tapes form the MD web as they are continuously pulled through the die to emerge from guides 20 and are fed from supply roll 16. Plastic resin 22, such as a low melt index polypropylene Himont PD403 (available from Himont Corp. of Wilmington DE) is supplied to the die under pressure and is discharged through slits 24 and 26 located adjacent guides 20. Normally the slits are closed by reciprocable pistons 28 and 30. When the pistons close the slits, resin is deposited only on the tapes, as they move through the die, to provide encapsulation of the prepreg in a second layer of plastic (forming a compound composite). When the pistons are moved to open the slits, plastic resin flows out to form transverse strands 12 (TD) which are composed solely of low melt index polypropylene i.e., such A3 Himont PD403. The resultant web or grid structure is like that shown in FIG. 1 in which the MD strands 10 are reinforced compound composite of continuous fibers, high melt index polypropylene and low melt index polypropylene. The TD stands 12, are low melt index polypropylene joined to the MD strands. By reciprocating the pistons as the prepreg tapes are pulled through the die a variety of net-like or grid structure webs may be formed. Various plastics and fibers may be used in a wide combination of materials. Fibers such as glass, carbon, graphite, polyaramid fibers, ceramic fibers and various metals may be used. Plastics such as polyethylene, nylons, ABS, PVC, Polyesters and Polyphenylenesulfides maybe used.

Figure 4:
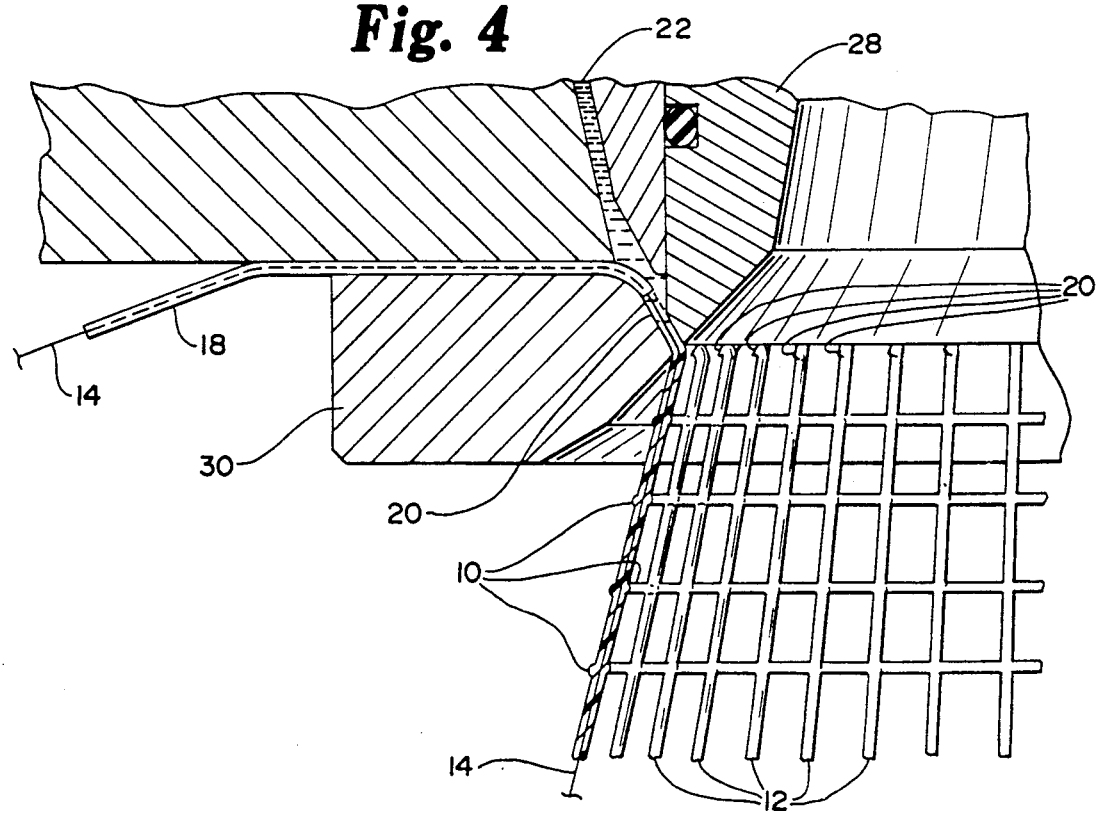

Referring now to FIGS. 3 and 4, they show in schematic a cylindrical die based system for forming the grid. A fragmentary side elevational view 40 with parts cut away is shown in FIG. 3. FIG. 4 is an enlarged detail of the area circled at 4 in FIG. 3. Like elements are similarly numbered as in FIGS. 1 and 2. At the present writing, this die arrangement may represent the most useful production die for preparing the compound composite grid of the invention. It operates in a similar manner to the die in FIG. 2.

Compared to previous grid structures used for reinforcement of soils in various civil engineering applications, a grid produced with continuous fiber reinforced composite strands in either one or both directions has significant advantages. These advantages are primarily, but not exclusively, as follows:

Ability to incorporate desired tensile properties by choice of fiber-type, fiber-content, and plastic matrix type.

Significantly improved tensile properties (higher tensile strength and much higher modulus) at lower unit weight.

Greater geometric (dimensional) stability under load, especially compared with woven or knitted fiber grid products.

Comparison of the invention versus the premier product currently on the market by Tensar Corp. of Marietta, Ga. for soil reinforcement (Tensar UX1200) shows the following:

| Product (*) | MD Strand Breaking | |
|---|---|---|
| | Weight (#/sq ft.) | Force (#/strand) |
| Tensar SR-2 | 0.188 | 269 |
| (MDSC-20/ft) | | |
| (TDSC-3/ft) | | |
| (Unidirectional | | |
| Strength in MD) | | |
| Ex-1 | 0.183 | 1350 |
| Ex-2 | 0.159 | 1125 |
| Ex-3 | 0.134 | 900 |
| Ex-4 | 0.110 | 675 |
| Ex-5 | 0.040 | 450 |

*EX-1 thru 5 all illustrate S-glass filaments which are oriented in the machine direction MD. Strand count MD = 20/ft of width and TD = 3/ft of width. MD strand break forces for Ex-1 thru 5 are derived from theoretical analysis based on 60 vol % continuous S-glass fibers in a matrix of 40 vol % PP polypropylene and a tensile strength of the glass fibers = 250,000 psi.

**Actual measurements of strand breaking force are difficult to make due to the very high strength of the composite strands. However, preliminary attempts on Ex-1 have shown that 750#/strand < Force (actual) < 1350#/strand and it is estimated that Force (actual) is about 90% of the calculated value. That is, maximum force measured before slippage of the sample was observed in the jaws of the test machine and was found to 750#/strand. Based on calculations, the force should have been 1350#/strand. Therefore, the actual value of the test sample, had there been no slippage, would be between 750#/strand and 1350#/strand. It is estimated that it would have been approximately 90% of the calculated 1350#/strand.

This completes the description of the preferred and alternate embodiments of the invention. Those skilled in the art may recognize other equivalents to the specific embodiment described herein, which equivalents are intended to be encompassed by the claims attached hereto.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

WHAT IS CLAIMED:

1. In a plastic grid structure comprised of first and second sets of intersecting generally transverse series of polymeric elongate members in which the members of each set cross and intersect at more or less regular intervals with each other to form a net-like structure, the improvement comprising: providing at least some of the strand members of at least one of the sets with compound composite reinforced structure.

2. The improved grid structure of claim 1 in which the plastic is of the thermoplastic type.

3. The improved grid structure of claim 1 in which the plastic is of the thermoset type.

4. The improved grid structure of claim 1 in which at least some of the strands of both sets of strand members are of compound composite reinforced structure.

5. The improved grid structure of claim 4 in which the plastic is of the thermoplastic type.

6. The improved grid structure of claim 4 in which the plastic is of the thermoset type.

7. The improved grid structure of claim 1 in which the members of both sets are substantially flat and generally rectangular in cross-section.

8. The improved grid structure of claim 1 in which the sets intersect with each other at about 90°.

9. The improved grid structure of claim 1 in which the plastic is polypropylene.

10. The improved grid structure of claim 1 in which the reinforcing fibers are of fiberglass.

11. The improved grid structure of claim 1 in which the reinforcing fibers are of polyaramid.

12. The improved grid structure of claim 1 in which the reinforcing fibers are of carbon fiber.

13. The improved grid structure of claim 1 in which the improved strand members extend in the MD.

14. The improved grid structure of claim 1 in which all of the MD strands are of compound composite structure.

15. The improved grid structure of claim 1 in which all of the strands are of compound composite structure.

* * * * *

UNITED STATES PATENT AND TRADEMARK OFFICE
CERTIFICATE OF CORRECTION

PATENT NO. : 5,045,377
DATED : September 3, 1991
INVENTOR(S) : Amata, Charles D.

It is certified that error appears in the above—identified patent and that said Letters Patent is hereby corrected as shown below:

Col. 1, line 33, delete "4,312,387" and insert therefor -- 4,439,387 --

Col. 3, line 39, delete "PP" before polypropylene

Signed and Sealed this

Twenty-second Day of December, 1992

Attest:

DOUGLAS B. COMER

Attesting Officer     Acting Commissioner of Patents and Trademarks